(12) United States Patent
Chang

(10) Patent No.: US 7,199,539 B2
(45) Date of Patent: Apr. 3, 2007

(54) MOTOR SOFT START CONTROLLER

(75) Inventor: Kuo-Ming Chang, Taichung (TW)

(73) Assignee: Deep Ocean Technology Corp., Taichung (TW)

( * ) Notice: Subject to any disclaimer, the term of this patent is extended or adjusted under 35 U.S.C. 154(b) by 139 days.

(21) Appl. No.: 11/100,396

(22) Filed: Apr. 7, 2005

(65) Prior Publication Data
US 2006/0145640 A1 Jul. 6, 2006

(51) Int. Cl.
*H02K 21/00* (2006.01)

(52) U.S. Cl. .................. 318/254; 318/138; 318/439

(58) Field of Classification Search .......... 318/254, 318/138, 439, 434, 778, 798, 806, 807, 808, 318/809, 810, 811
See application file for complete search history.

(56) References Cited

U.S. PATENT DOCUMENTS 4,451,112 A * 5/1984 Hattori et al. ............... 318/778
2004/0232872 A1* 11/2004 Sunaga et al. ............... 318/652

* cited by examiner

*Primary Examiner*—Karen Masih
(74) *Attorney, Agent, or Firm*—Bacon & Thomas, PLLC

(57) ABSTRACT

A motor soft start controller, which is composed of a rectifying and voltage-stabilizing circuit, a microprocessor, a motor switch electrically connected with a motor, a reset button, a signal amplifying circuit electrically connected with a touch piece, a motor driving circuit, and a current detecting circuit. The current detecting circuit monitors the current flowing through the motor to control. The microprocessor controls the motor driving circuit to further control the current. Further, the motor can be activated correctly by the dual arrangement of the reset button and the motor switch to avoid erroneous activation thereof.

5 Claims, 2 Drawing Sheets

MOTOR SOFT START CONTROLLER

BACKGROUND OF THE INVENTION

1. Field of the Invention

The present invention relates generally to motor start art, and more particularly, to a motor soft start controller.

2. Description of the Related Art

While a conventional motor is activated, an instantaneously heavy current is usually generated and heavy enough to damage the motor and electronic elements of the control circuit. Thus, the conventional motor usually employs a bridge rectifier in cooperation with at least one fuse to protect the motor and the electronic elements from damage caused by the overload of the instantaneously heavy current. However, during the operation of the motor, it is quite inconvenient that the fuse is subject to burnout and then the user has to replace the damaged fuse frequently.

Afterwards, some companies developed the art of motor soft start to improve the problems indicated above. The motor soft start is to control and prevent the instantaneously heavy current generated upon activation of the motor operation from excess. However, a conventional soft start controller functions only upon the activation and fails to prevent the motor from abnormal current, such as overload or jam-up of the motor, occurred during the operation of the motor and it may damage the motor.

Further, there is only one single switch mounted on the conventional motor for activation of the motor. Although the user can directly turn on the switch to activate the motor for operation, the user may carelessly touch the switch to turn it on to activate the motor. In light of above, the improvement on the conventional motor is necessary.

SUMMARY OF THE INVENTION

The primary objective of the present invention is to provide a motor soft start controller, which monitors the operational status of a motor and protects the motor from damage caused by overload or jam-up of the motor.

The secondary objective of the present invention is to provide a motor soft start controller, which includes two switches and enables the motor to enter a protection mode while the motor idles for a while. Under the protection mode, the user has to turn on the two switches together to reactivate the motor, thereby securing the motor to be correctly operated.

The foregoing objectives of the present invention are attained by the motor soft start controller, which is composed of a rectifying and voltage-stabilizing circuit, a microprocessor, a motor switch, a reset button, a signal amplifying circuit, a motor driving circuit, and a current detecting circuit. The rectifying and voltage-stabilizing circuit is electrically connected with an alternating current (AC) power for converting AC into direct current (DC) and stabilizing voltage. The microprocessor is electrically connected with the rectifying and voltage-stabilizing circuit for input/output of signals and data processing, entering a protection mode if idling for a predetermined time. The motor switch is electrically connected with the AC power and a motor for switching on/off the motor. The reset button is electrically connected with the AC power and the microprocessor for resetting and enabling the microprocessor to release the protection mode once pushed. The signal amplifying circuit is electrically connected with a touch piece and the microprocessor. The motor driving circuit is electrically connected with the motor and the microprocessor, including a first triggering bidirectional thyristor (TRIAC), an electrically controlled switch, a second TRIAC, and a capacitor, for driving operation of the motor. The current detecting circuit is electrically connected with the first TRIAC and the microprocessor for detecting amperage of the current flowing through the motor and then preventing the motor from erroneous activation during its operation.

DETAILED DESCRIPTION OF PREFERRED EMBODIMENTS

Figure 1:
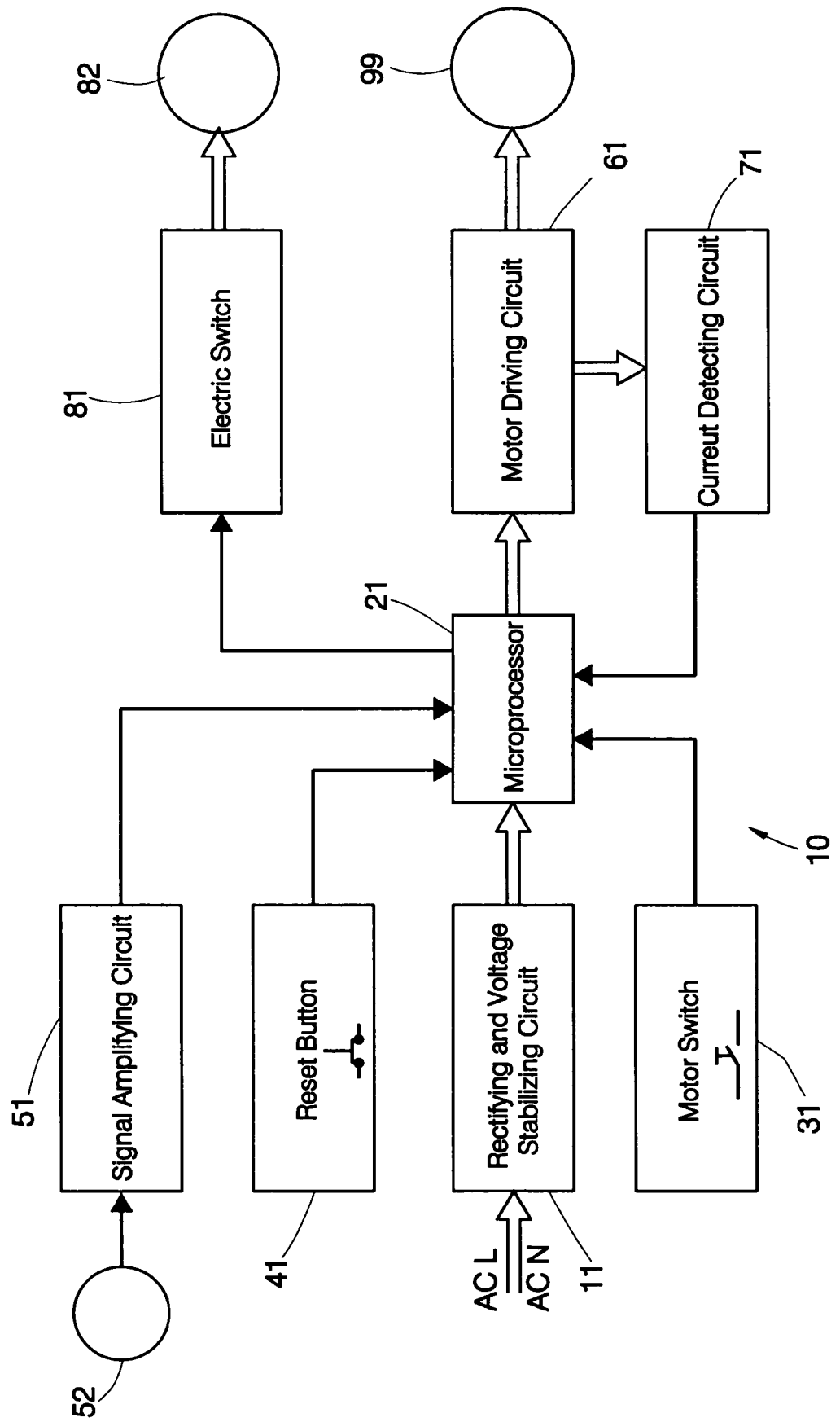
FIG. 1 is a block diagram of the present invention.
Figure 2:
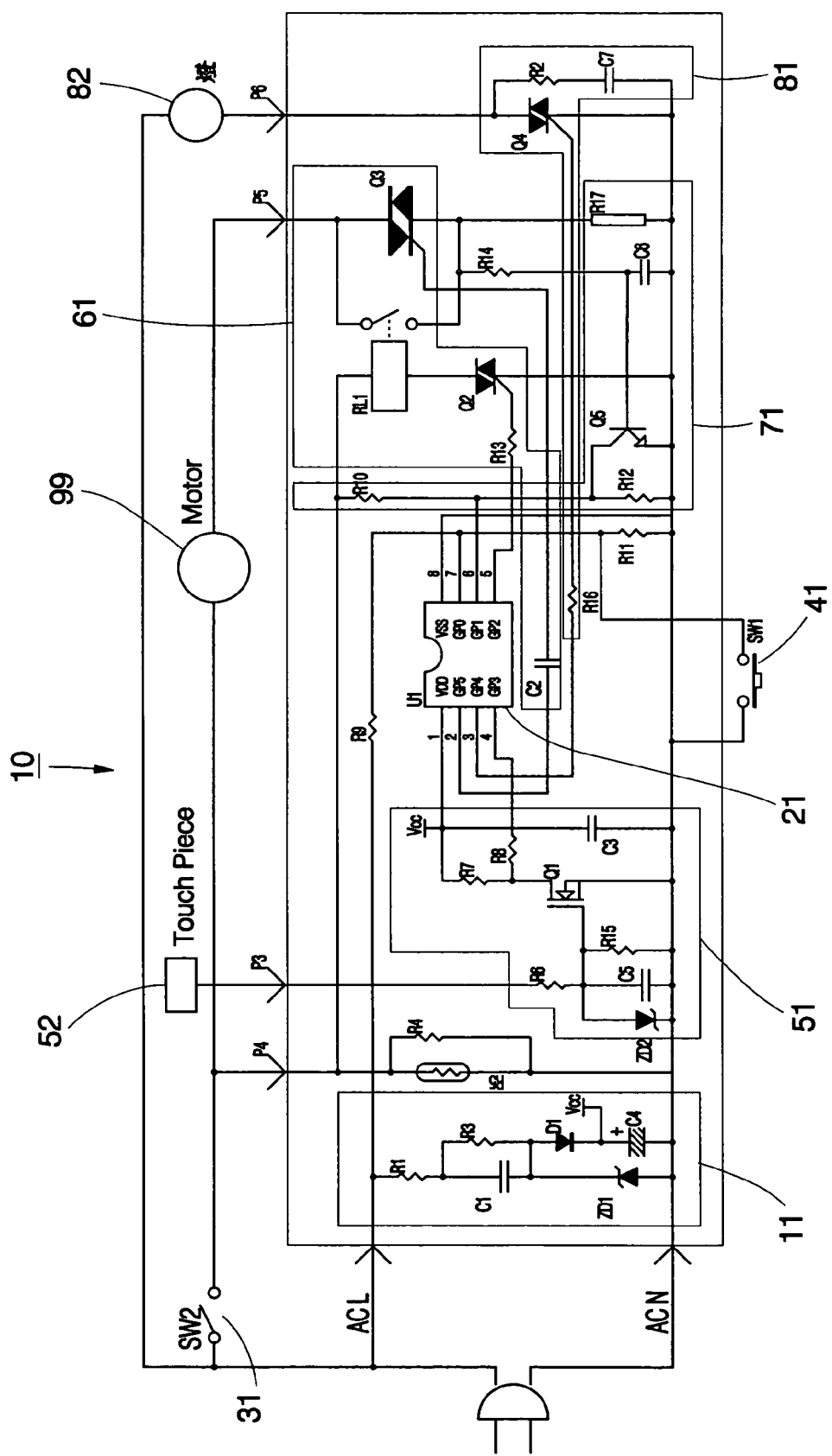
FIG. 2 is a circuitry of the present invention.

Referring to FIGS. 1–2, a motor soft start controller 10 constructed according to a first preferred embodiment of the present invention is composed of a rectifying and voltage-stabilizing circuit 11, a microprocessor 21, a motor switch 31, a reset button 41, a signal amplifying circuit 51, a motor driving circuit 61, a current detecting circuit 71, and an electrical switch 81.

The rectifying and voltage-stabilizing circuit 11 is electrically connected with an AC power for converting AC into DC and stabilizing voltage. Because the rectifying and voltage-stabilizing circuit 11 is known as prior art, no further recitation is necessary.

The microprocessor 21 is electrically connected with the rectifying and voltage-stabilizing circuit 11 for input/output of signals and data processing. The microprocessor 21 will enter a protection mode if idling for a predetermined time.

The motor switch 31 is electrically connected with the AC power and a motor 99 for switching on/off the motor 99.

The reset button 41 is electrically connected with the AC power and the microprocessor 21. The microprocessor 21 will be reset to release the protection mode if the reset button 41 is pushed.

The signal amplifying circuit 51 includes a Zener diode ZD2 and a field-effect transistor (FET) Q1 which is electrically connected with a touch piece 52 and the microprocessor 21, for amplifying and transmitting a signal generated by a user's hand touching the touch piece 52 to the microprocessor 21.

The motor driving circuit 61 is electrically connected with the motor 99 and the microprocessor 21, including a first TRIAC Q3, an electrically controlled switch RL1, a second TRIAC Q2, and a capacitor C2, for driving operation of the motor 99. The electrically controlled switch RL1 in this embodiment is a relay. The second TRIAC Q2 is electrically connected with the microprocessor 21 and the electrically controlled switch RL1 for providing a signal of switching on/off the electrically controlled switch RL1.

The current detecting circuit 71 includes a transistor Q5, a heavy-current resistor R17, and two series-wound potential-divider resistors R10 and R12, for detecting the amperage of the current flowing through the motor 99. The heave-current resistor R17 is electrically connected with the first TRIAC Q3. The transistor Q5 is electrically connected with the two potential-divider resistors R10 and R12 and the microprocessor 21.

The electrical switch 81 includes a third TRIAC Q4 and a resistor R16, being electrically connected with the microprocessor 21 and an illuminator 82. The illuminator 82 can be activated/deactivated by the electrical switch 81 to illuminate as an indicator.

The motor soft start controller 10 of the present invention is to control the soft start of the motor 99 and to protect the motor 99 from overload or jam-up during its operation. When the motor switch 31 is turned on, the AC gains voltage drop through the two potential-divider resistors R10 and R12 and then flows to the microprocessor 21 to render a signal of activating the motor 99. The microprocessor 21 triggers the first TRIAC Q3 through the capacitor C2 to control interception of voltage upon activation of the motor 99. The more time it passes, the greater voltage the first TRIAC Q3 outputs. When the outputted voltage of the first TRIAC Q3 reaches maximum, the microprocessor 21 controls the electrically controlled switch RL1 through the second TRIAC Q2 to work to enable closed circuit and to further enable full closed circuit instead of the first TRIAC Q3, thereby enabling full-speed operation of the motor 99. In the meantime, the first TRIAC Q3 is deactivated.

In addition, the user can activate the motor 99 by an alternative way as recited below. When the user touches the touch piece 52, a physiological signal of the user is generated. The Zener diode ZD2 of the signal amplifying circuit 51 does electrical potential limitation to the physiological signal, and then the FET Q1 amplifies and inputs the signal to the microprocessor 21, and then the user can turn on the motor 99 for receiving the signal for activation. Meanwhile, the motor 99 is activated by dual ways of manual touch and the motor switch 31.

During the operation of the motor 99, the current flows through the heavy-current resistor R17 to gain a voltage drop, and then the voltage drop of the current is amplified by the transistor Q5. Next, the amperage of the current can be accessed by the two potential-divider resistors R10 and R12 though the amplified voltage drop as to whether it is greater than a default value. If it is greater than the default vale, the microprocessor 21 will control the electrically controlled switch RL1 to turn off to cut off the power of the motor 99. Besides, when the user intends to switch off the motor 99, the user can turn off the motor switch 31 to command the microprocessor 21 to switch off the motor 99.

If the motor 99 idles for a while, the microprocessor 21 will enter the protection mode. In the meantime, the microprocessor 21 refuses to accept any signal of activating the motor switch 31. The user has to push the reset button 41 to enable the microprocessor 21 to be reset and release the protection mode and then turn on the motor switch 31 to activate the motor 99. Briefly, the user has to push the reset button 41 and the motor switch 31 in turn to activate the motor 99, thereby securing the operation of motor 99 subject to correct and safe way.

In conclusion, the present invention includes the following advantages.

1. Protect the Motor:

The present invention not only provide the soft start for the motor 99 but also monitors the current flowing through the motor 99 and cuts off the power to prevent the motor 99 from overload or jam-up upon excessively heavy current.

2. Safe Operational Environment:

While the motor 99 idles for a while, the present invention enters the protection mode, under which the user has to push the reset button 41 to reset the microprocessor 21 and then turn on the motor switch 31 to activate the motor 99 and by which the motor 99 can be operated correctly and safely.

What is claimed is:

1. A motor soft start controller comprising:
   a rectifying and voltage-stabilizing circuit connected with an AC power for converting AC into DC;
   a microprocessor connected with said rectifying and voltage-stabilizing circuit for output of signal and data processing, said microprocessor entering a protection mode upon idling for a predetermined time;
   a motor switch connected with said AC power and a motor for switching on/off said motor;
   a reset button connected with said AC power and said microprocessor for resetting said microprocessor and enabling the microprocessor to release said protection mode upon pushed;
   a signal amplifying circuit connected with a touch piece and said microprocessor for amplifying a signal generated by a user touching said touch piece and for transmitting said amplified signal to said microprocessor;
   a motor driving circuit connected with said motor and said microprocessor, said signal circuit having a first TRIAC, an electrically controlled switch, a second TRIAC, and a capacitor, for driving operation of said motor; and
   a current detecting circuit connected with said first TRIAC and said microprocessor for detecting amperage of current flowing through said motor.

2. The controller as defined in claim 1, wherein said signal amplifying circuit comprises an FET and a Zener diode.

3. The controller as defined in claim 1, wherein said current detecting circuit comprises a transistor, a heavy-current resistor, and two series-wound potential-divider resistors.

4. The controller as defined in claim 1 further comprising an electrical switch, said electrical switch having a third TRIAC and a resistor and connected with said microprocessor and an illuminator for controlling activation/deactivation of said illuminator.

5. The controller as defined in claim 1, wherein said electrically controlled switch of said motor driving circuit is a relay.

* * * * *